(12) United States Patent
Buchanan, IV et al.

(10) Patent No.: US 10,137,362 B2
(45) Date of Patent: Nov. 27, 2018

(54) EXO-TENDON MOTION CAPTURE GLOVE DEVICE WITH HAPTIC GRIP RESPONSE

(71) Applicants: Thomas F Buchanan, IV, West Chester, OH (US); Timothy Meyer, Latham, NY (US)

(72) Inventors: Thomas F Buchanan, IV, West Chester, OH (US); Timothy Meyer, Latham, NY (US)

( * ) Notice: Subject to any disclaimer, the term of this patent is extended or adjusted under 35 U.S.C. 154(b) by 0 days.

(21) Appl. No.: 15/497,617

(22) Filed: Apr. 26, 2017

(65) Prior Publication Data

US 2017/0319950 A1 Nov. 9, 2017

Related U.S. Application Data

(60) Provisional application No. 62/331,580, filed on May 4, 2016.

(51) Int. Cl.

| | |
|---|---|
| *A63F 13/212* | (2014.01) |
| *A63F 13/21* | (2014.01) |
| *A41D 19/00* | (2006.01) |
| *A63F 13/40* | (2014.01) |
| *A63F 13/42* | (2014.01) |
| *A63F 13/428* | (2014.01) |
| *A63F 13/285* | (2014.01) |

(52) U.S. Cl.
CPC .......... *A63F 13/21* (2014.09); *A41D 19/0027* (2013.01); *A63F 13/212* (2014.09); *A63F 13/40* (2014.09); *A63F 13/42* (2014.09); *A63F 13/285* (2014.09); *A63F 13/428* (2014.09)

(58) Field of Classification Search
None
See application file for complete search history.

(56) References Cited

U.S. PATENT DOCUMENTS

| | | | |
|---|---|---|---|
| 5,429,140 A | 7/1995 | Burdea et al. | |
| 6,128,004 A | 10/2000 | McDowall et al. | |
| 6,454,681 B1 | 9/2002 | Brassil et al. | |
| 8,849,453 B2 | 9/2014 | Bergelin et al. | |
| 9,104,271 B1 | 8/2015 | Adams et al. | |
| 2011/0071664 A1 | 3/2011 | Linn et al. | |
| 2011/0202306 A1* | 8/2011 | Eng | A61F 4/00 702/150 |
| 2012/0157263 A1 | 6/2012 | Sivak et al. | |

* cited by examiner

*Primary Examiner* — Damon Pierce
(74) *Attorney, Agent, or Firm* — Maheen Baber; Cole Sadkin, LLC

(57) ABSTRACT

Motion capture and haptic glove systems/methods and devices are provided in this invention. In one embodiment of the invention a motion capture and haptic glove system is described, comprising: A glove portion to be worn on top of a user's hand, the glove having finger portions for the fingers and thumb of the user; a plurality of anchoring finger caps circumscribed around the extremities of the finger portions; a plurality of anchor points configured to generate sensor data identifying a flexion/extension and an abduction/adduction of the finger portions; a plurality of tendon-like cables configured to transmit the flexion/extension and the abduction/adduction data to a plurality of measuring devices for processing; a plurality of return force providers to ensure flexion and tension in the tendon-like cable elements; and a housing structure residing on the forearm and connected to the glove portion via the plurality of tendon-like cables.

20 Claims, 4 Drawing Sheets

EXO-TENDON MOTION CAPTURE GLOVE DEVICE WITH HAPTIC GRIP RESPONSE

CROSS REFERENCE TO RELATED APPLICATION

This application claims the benefit of U.S. Provisional Application No. 62/331,580 filed on May 4, 2016, the disclosure of which is incorporated herein by reference.

BACKGROUND

Field of the Invention

The present invention relates to the field of motion capture and haptic feedback. More specifically, the present invention relates to systems and devices that relay precise and accurate finger motions and haptic sensations, as well as relay the sensations of shape and structure of an object within the hand upon the alignment of the finger caps in the palm.

Description of the Related Art

How users interact with objects in the virtual reality world is one of the most important factors in the immersive experience. A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

Another growing trend in the industry involves the development of cloud-based gaming systems. Such systems may include a remote processing server that executes a game application, and communicates with a local client that can be configured to receive input from users and render video on a display.

However, one thing that most users are looking forward to is complete immersion that will let them escape the real world and truly experience the virtual world around them. To do this, they will need more than just the head tracking, visual, and audio capabilities of the Head mounted display (HMDs), the game controllers or cloud based gaming systems. They will also need immersion of their hands, fingers, arms, legs, and feet to truly interact and move around the environment. For Virtual Reality, immersion can best be described as the perception of being physically present in a non-physical world via the recreation of real world stimuli. It is in the context of these problems that the current invention arises. Specifically, the problem that this invention is solving is the immersion of the hands and fingers. The invention has a unique motion capture system that relays precise and accurate finger motions as well as a system that relays haptic sensations and also relays the sensations of shape and structure of an object within the hand upon the alignment of the finger caps in the palm.

STATEMENT OF THE OBJECTS

Embodiments of the present invention provide for a glove system, device and associated methods.

An object of the invention is the recreation of precise and accurate movement as well as sense of touch via haptic feedback.

A further object of the invention is to generate haptic sensations without requiring an external device to be held or grasped and easily applies haptic force gradients simply via the alignment of the finger caps in the palm.

A further object of the invention is to provide flexible conductive contacts on the fingertips, the rest of the fingers, and other surfaces of the hand.

Still another object of the invention is to provide users with a complete virtual reality immersion experience.

Other objects and advantages of the present invention will be set forth in part in the description and in the drawings that follow and, in part, will be obvious from the description or may be learned by practice of the invention.

SUMMARY

To achieve the foregoing objects, and in accordance with the purpose of the invention as broadly described herein, the present invention provides systems and devices for accurately measuring precise hand movement as well as providing a haptic feedback. Reference in the specification to one embodiment or an embodiment means that a particular feature, structure or characteristic described in connection with the embodiment is included in at least one embodiment of the invention. The appearance of the phrase "in one embodiment" in various places in the specification do not necessarily refer to the same embodiment.

It will be appreciated from the description of the glove systems and devices that they may be used in many environments and made in many embodiments. As used herein, a glove device may be utilized as a glove controller for a video game. However, it should be understood that the glove device does not necessarily have to be a controller utilized for playing games, but may be used for interfacing with virtual objects on a display screen viewable by a user, and for any other suitable purpose for which input defined from the glove device may be applied. It should be appreciated that the present invention can be implemented in numerous ways, such as a process, an apparatus, a system, a device or a method on a computer readable medium. Several inventive embodiments of the present invention are described below.

In one embodiment of the invention, a glove portion to be worn on top of a user's hand, the glove having finger portions for the fingers and thumb; a plurality of anchoring finger caps circumscribed around the extremities of the finger portions; a plurality of anchor points configured to generate sensor data identifying a flexion/extension as well as abduction/adduction of the finger portions; a plurality of tendon-like cables configured to transmit the flexion/extension as well as abduction/adduction data to a plurality of measuring devices for processing; a plurality of return force providers to ensure flexion and tension in the tendon-like cable elements; and a housing structure residing on the forearm and connected to the glove portion via the plurality of tendon-like cables are described.

In another embodiment of the invention, the glove further includes: at least one vibrating motor configured to be placed within at least one of the finger caps to create a vibrational motion as well as relay the sensations of shape and structure of an object within the hand upon the alignment of the finger caps in the palm.

In one embodiment of the invention the measuring device may be a potentiometer or a rotary encoder.

In a further embodiment of the invention the anchoring points are capable of capturing all the Degrees of Freedom of the invention.

In yet another embodiment of the invention the vibrational motors allow a user to experience haptic sensations upon interaction with objects in the virtual world.

In a further embodiment of the invention the return force provider quantifies an amount of force applied to at least one portion of the glove device.

In another embodiment motors can be used in place of the return force providers, to control the skeletal and physical movements of the user's hands.

In yet another embodiment of the invention, a computer processing unit inputs positional and displacement data transmitted from the measuring device and utilizes the data to impart equal and opposite force on the return force providers.

The example embodiments are in such detail as to clearly communicate the invention. However, the amount of detail offered is not intended to limit the anticipated variations of embodiments; but, on the contrary, the intention is to cover all modifications, equivalents, and alternatives falling within the spirit and scope of the present invention as defined by the appended claims.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

The present invention will now be described with reference to the following drawings, in which like reference numbers denote the same element throughout.

DETAILED DESCRIPTION

Embodiments of the present invention are described more fully below with reference to the accompanying drawings, which form a part hereof, and which show exemplary embodiments for practicing the invention. However, embodiments may be implemented in many different forms and should not be construed as limited to the embodiments set forth herein; rather these embodiments are provided so that this disclosure will be thorough and complete, and will fully convey the scope of the invention to those skilled in the art. The following detailed description is, therefore, not to be taken in the limiting sense.

Figure 1:
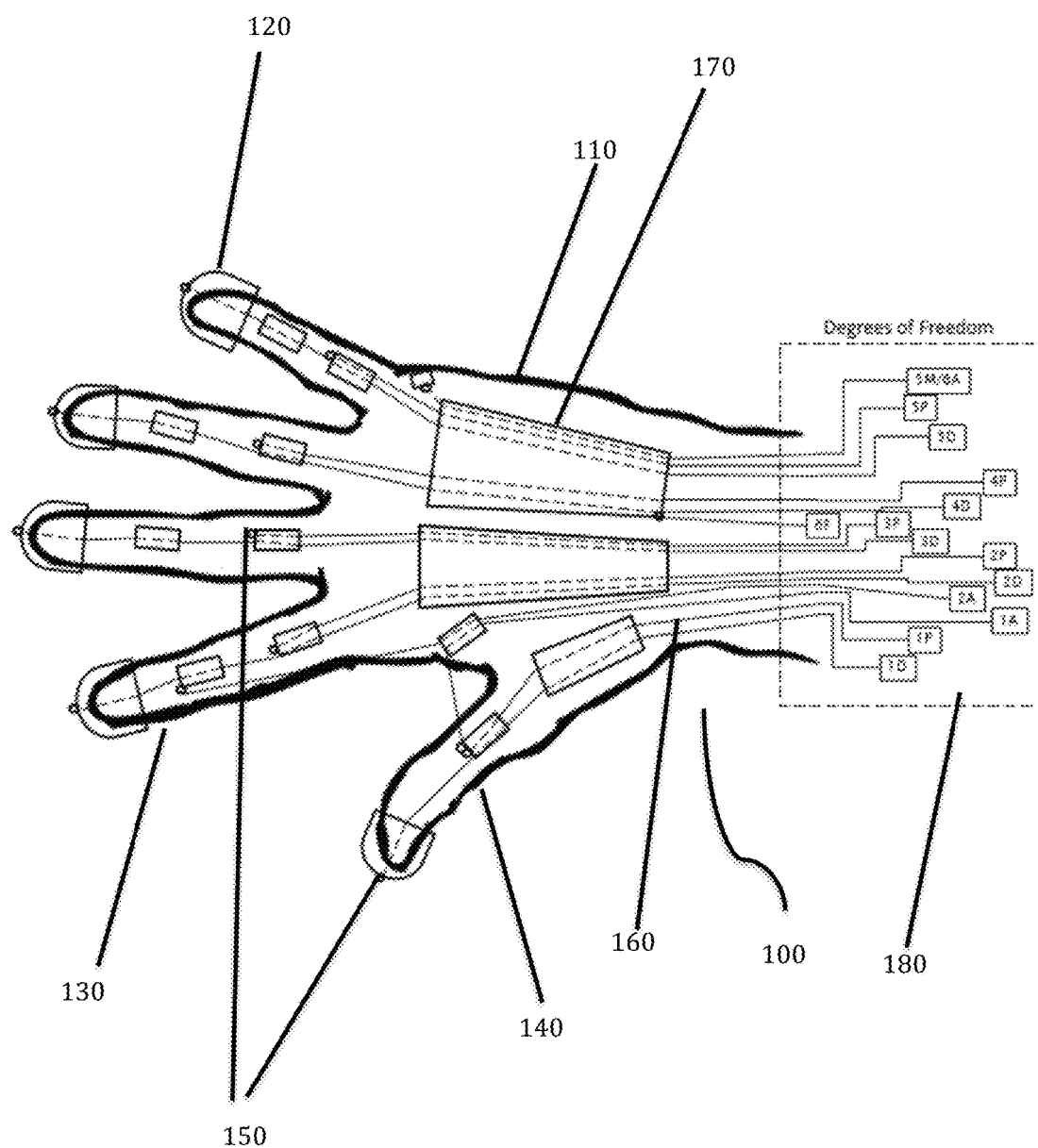
FIG. 1 is a schematic illustration of an embodiment of the motion capture motion capture and haptic glove system.
Figure 3:
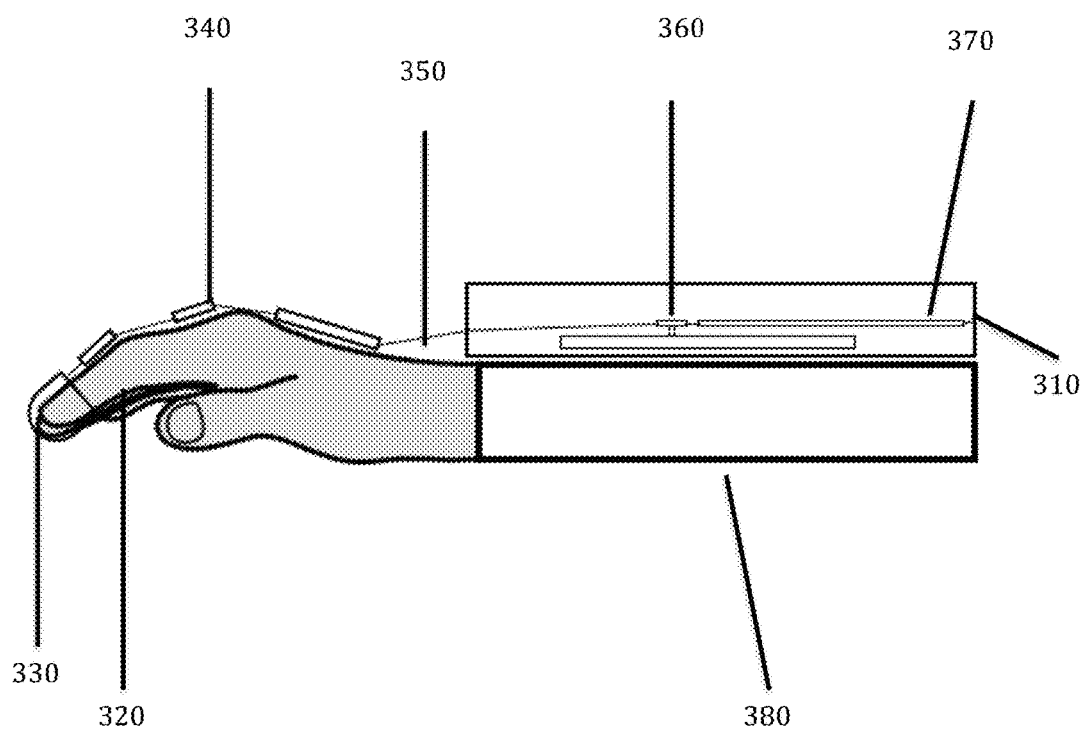
FIG. 3 is a schematic illustration of the side-view of the housing structure as attached to the glove system of FIG. 1.

Referring now to the figures, FIG. 1 depicts a top-view of an embodiment of the glove system, 100. The system consists of a glove 110, that an operator or user can wear on top of their hand. When worn by an operator, the glove, 110, allows in the recreation of accurate and precision movement as well as the sense of touch via haptic feedback. The glove system, 100, consists of anchoring finger caps, 120, circumscribing the tips of each finger, 130 and the thumb, 140. At the extremities of the anchoring finger caps, 120, reside the anchor points, 150. Further anchor points, 150, are placed at various joint positions within the hand, to allow for the most precise and accurate movement measurement. These anchor points, 150, are strategically placed in order to recreate accurate and precise hand and finger movements that highlight the movement from the critical points for each finger(s), 130, and the thumb, 140. Furthermore, these anchor points, 150, are capable of capturing all of the Degrees of Freedom (DOF) of the hand, and to generate sensor data identifying some degree of flexion/extension as well as abduction/adduction of the finger, 130, or thumb, 140, portion of the glove system. When the fingers, 130, and thumb, 140, are closed into a fist these distal anchor points, 150, align linearly within the closed grip. All the anchor points, 150, are further attached to tendon-like cables, 160. These tendon-like cables, 160, then transmit the flexion/extension as well as abduction/adduction data, or DOF to a measuring device, which may be placed on the forearm (as shown in FIG. 3). These tendon-like cables, 160, are flexible in the sense that they allow a pull and tug of the hand with ease and without the possibility of breakage. The tendon-like cables, 160, are routed to the forearm via routing fixtures, 170, which ensure that each cable is correctly routed to the associated measuring device attached to the forearm. These routing fixtures, 170, are throughout the dorsal side of the hand to route the cables properly.

Figure 2:
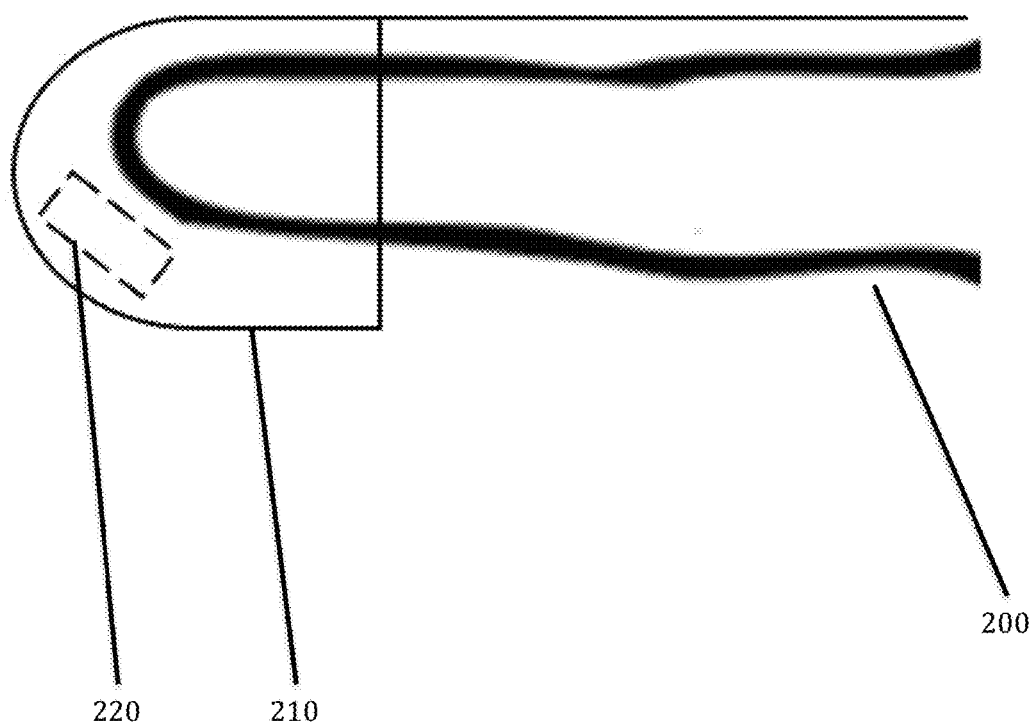
FIG. 2 is a schematic illustration of a single finger view of the input glove system of an embodiment of the invention.

The various DOFs, 180, measured by the measurement device located in a housing in the forearm may be as shown:
a. 5M/6A: 5th Metacarpophalangeal Joint, Opposition of 4th and 5th Metacarpals (5M) OR Abduction/Adduction of the Wrist (6A)
b. 5P: 5th Proximal Interphalangeal (PIP) Joint, Flexion/Extension 5th Proximal Phalanx
c. 5D: 5th Distal Phalanx Tip, Flexion/Extension 5th Distal and Middle Phalanges
d. 4P: 4th Proximal Interphalangeal (PIP) Joint, Flexion/Extension 4th Proximal Phalanx
e. 4D: 4th Distal Phalanx Tip, Flexion/Extension 4th Distal and Middle Phalanges
f. 6F: 3rd Carpometacarpal (CMC) Joint, Flexion/Extension of the Wrist
g. 3D: 3rd Distal Phalanx Tip, Flexion/Extension 3rd Distal and Middle Phalanges
h. 3P: 3rd Proximal Interphalangeal (PIP) Joint, Flexion/Extension 3rd Proximal Phalanges
i. 2P: 2nd Proximal Interphalangeal (PIP) Joint, Flexion/Extension 2nd Proximal Phalanges
j. 2D: 2nd Distal Phalanx Tip, Flexion/Extension 2nd Distal and Middle Phalanges
k. 2A: 2nd Distal Interphalangeal (DIP) Joint, Abduction/Adduction 2nd Phalange
l. 1A: 1st Interphalangeal (IP) Joint, Abduction/Adduction 1st Phalange
m. 1D: 1st Distal Phalanx Tip, Flexion/Extension 1st Distal and Proximal Phalanges n. 1P: 1st Interphalangeal (IP) Joint, Flexion/Extension 1st Metacarpal Referring to FIG. 2, a single finger displaying an embodiment of the invention is depicted. The finger, 200, has the anchoring cap, 210, circumscribed to its distal end. The anchoring cap, 210, is capable of housing the anchor point, as displayed in FIG. 1, or a vibrating motor, 220, or actuator, or both. By embedding a vibrating motor, 220, or, actuator that performs similar function, haptic sensations are possible upon interaction with objects in the virtual world. Upon touching an object in the virtual world, these vibrators, 220, or actuators vibrate independently and at different frequencies to reproduce different touch sensations, allowing the user complete immersion in the virtual reality world.

FIG. 3 depicts a side view of the housing internals along with the associated glove system. A single finger, 320, is shown with the associated anchor cap, 330, being circumscribed around it. Attached internally to the anchor cap, 320, is the cable like tendon, 350. The tendon-like cable allows the transmission of the flexion/extension data from the anchor point (as depicted in FIG. 1) to the internals of the housing, 310. The tendon-like cable is routed to the housing, 310, via the routing fixtures, 340. The housing, 310, is attached to the forearm, 380, via a strap, buckles, or the whole arm can be inserted into a sleeve for a firm grip and minimal movement during attachment. Inside the housing, 310, is a measurement device, 360. This measurement device allows for a measurement of the change in resistance or position from the anchor point via the tendon-like cable, 350. The transmitted data is then processed to determine a finger position and pose of the glove device. An example of a measurement device may be a variable resistor or a rotary encoder that is used per measured degree of freedom (DOF) of the hand and fingers. A further example of a variable resistor may be a potentiometer to measure the movements. The variable resistors or encoders must be placed on the proximal end of its respective DOF. These variable resistors or encoders can be either linear or radial, both providing the change of resistance or position with movement of the hand and fingers. Each variable resistor/potentiometer or encoder measures the position of the fingers, or the displacement data, with a high sampling rate. Furthermore, this positional/displacement data may then be read to the analog, in the case of the variable resistor, or digital, in the case of the encoder, input of a micro controller which then may utilize an analog to digital convertor to read the data to a computer. This data can then provide an accurate and noise free motion capture of the present position of the fingers and hand relative to the forearm. The forearm is tracked in three dimensional space by a third party tracking system (not shown). This means the computer has a reliable and accurate understanding of the position of the user's fingers and hand in three dimensional space. With the understanding of the position of the hand, the computer will interpret when a collision occurs between the user's hand, and a virtual object. Once this occurs it will apply equal and opposite force to the affected muscles via the return force providers, as discussed below. This creates the illusion to the user that he is indeed touching the virtual object.

Moreover, in order to keep tension in the tendon like-cable, 350, a return force provider, 370, is present at the end of the housing, 310. The return force provider, 370, may be in the form of a spring, rubber band, coil, or any material that provides the characteristics of any of those three. The return force provider, 370, allows the cables, 350, to be pulled and tugged during various hand movements. For example, the cables, 350, are selectively tensioned during a certain movement, as is when an operator is closing his hand into a desired grip pose. In another movement, the return force provider, 370, may release the tensile force to allow the cables, 350, to help release the grasp. In another embodiment, the return force provider can be supplemented by a motor (not shown) which provides additional strength to the tendon-like cables, 350, and allows to impart muscular movement to the hand artificially. These motors may also be enclosed in the housing structure, as described in FIG. 4.

Figure 4:
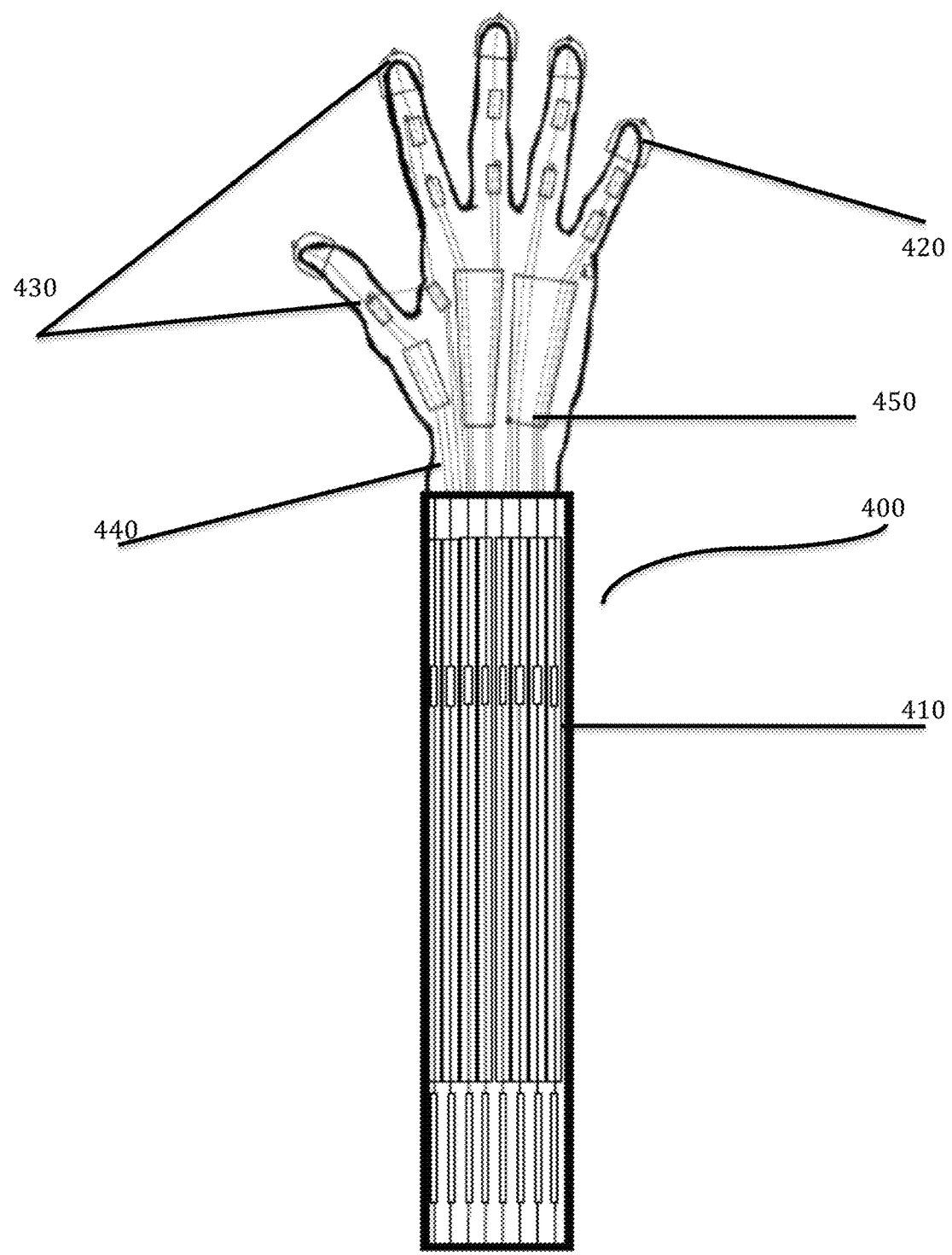
FIG. 4 is a schematic illustration of the top view of the glove system along with the attached housing structure.

FIG. 4 displays a front view of the housing structure with the attached glove device. The glove system, 400, is worn on an operator's hand, in the manner of a traditional glove, with the housing structure, 410, strapped, buckled or worn as a sleeve onto the forearm. The glove system, 400, is attached to the housing structure, 410 at the wrist of the hand, still allowing bending or rotating of the wrist as needed via a hinge. The anchoring caps, 420, are circumscribed onto the distal ends of each finger and thumb of an operator's hand, wherein the anchor points, 430, are located at the extremities of the anchoring caps, 420. Further anchor points, 430, are strategically located at various movement points of the fingers and thumb to provide for accurate movement measurement. Tendon-like cables, 440, are attached to each of the anchor points, 430, and are routed into the housing structure, 410, via routing fixtures, 450. The routing fixtures, 450, allow the associated tendon-like cables, 440, from each anchor point to be routed to its specific measurement device located within the housing structure, 410. A single measurement device or variable resistor or encoder is used to measure each DOF movement for a single anchor point and process this data to determine a finger position and pose of the glove device. The measuring device must be placed on the proximal end of the movement, as displayed in FIG. 1. Furthermore, within the housing structure is provided the return force provider, which may be in the form of, for example, a spring. This return force provider ensures that the glove can be flexed and/or tightened during the various motions and movements with ease, to optimize the user's virtual reality experience.

While the best modes for carrying out the invention have been described in detail, those familiar with the art to which this invention relates will recognize various alternative designs and embodiments for practicing the invention within the scope of the appended claims.

What is claimed is:

1. A motion capture and haptic glove system comprising:
   a. A glove portion to be worn on top of a user's hand, the glove having finger portions for the fingers and thumb of the user;
   b. a plurality of anchoring finger caps circumscribed around the extremities of the finger portions;
   c. a plurality of anchor points configured to generate sensor data identifying a flexion/extension and an abduction/adduction of the finger portions;
   d. a plurality of tendon-like cables configured to transmit the flexion/extension and the abduction/adduction data to a plurality of measuring devices for processing;
   e. a plurality of return force providers to ensure flexion and tension in the tendon-like cable elements;
   f. a housing structure residing on the forearm and connected to the glove portion via the plurality of tendon-like cables; and
   g. at least one vibrating motor to be placed within at least one of the anchoring finger caps to relay the sensations of shape and structure of an object within the hand upon the alignment of the finger caps in the palm.

2. The system of claim 1, wherein the housing structure is attached to the forearm via buckles.

3. The system of claim 1, wherein the anchor points are located at the extremities of the anchoring finger caps and at various joint positions on the hand.

4. The system of claim 1, wherein the anchor points are capable of capturing all the degree of freedom movements of the finger portions.

5. The system of claim 1 further comprising at least one measuring device placed within the housing structure.

6. The system of claim 1, wherein the measuring device measures the changes in resistance or position from the anchor points.

7. The system of claim 6, wherein the measured change in resistance or position is used to determine a positional and a displacement data of the glove portion.

8. The system of claim 1, wherein the measuring device may be a variable resistor or a rotary encoder.

9. The system of claim 1, further comprising a computer processing unit that inputs data transmitted from the measuring device and utilizes the positional and the displacement data received to impart an equal and opposite force on the return force providers.

10. The system of claim 1, wherein the tendon-like cables are routed to the forearm via routing fixtures, the routing fixtures ensuring that each tendon-like cable is correctly routed to its associated measuring device.

11. The system of claim 1, wherein the vibrators allow haptic sensations upon interaction with virtual objects.

12. The system of claim 11, wherein each vibrator is capable of vibrating independently and at differing frequencies.

13. A motion capture and haptic glove device comprising:
  a. A glove portion to be worn on top of a user's hand, the glove having finger portions for the fingers and thumb of the user;
  b. A plurality of anchoring finger caps circumscribed around the extremities of the finger portions;
  c. a plurality of anchor points configured to generate sensor data identifying a flexion/extension and an abduction/adduction of the finger portions;
  d. a plurality of tendon-like cables configured to transmit the flexion/extension and the abduction/adduction data to a plurality of measuring devices for processing;
  e. a plurality of return force providers to ensure flexion and tension in the tendon-like cable elements;
  f. a housing structure residing on the forearm and connected to the glove portion via the plurality of tendon-like cables; and
  g. at least one vibrating motor to be placed within at least one of the anchoring finger caps to relay the sensations of shape and structure of an object within the hand upon the alignment of the finger caps in the palm.

14. The device of claim 13, wherein the anchor points are located at the extremities of the anchoring finger caps and at various joint positions on the hand.

15. The device of claim 13 further comprising at least one measuring device placed inside the housing structure, wherein the measuring device measures the changes in resistance or position from the anchor points.

16. The device of claim 15, wherein the measured change in resistance or position is used to determine the positional and the displacement data of the glove device.

17. The device of claim 13, further comprising a computer processing unit that inputs data transmitted from the measuring device and utilizes the positional and the displacement data received to impart an equal and opposite force on the return force providers.

18. The device of claim 13, wherein the vibrators allow haptic sensations upon interaction with virtual objects.

19. The device of claim 18, wherein each vibrator is capable of vibrating independently and at differing frequencies.

20. A motion capture and haptic method, comprising the steps of:
  a. Utilizing a plurality of anchor points, circumscribed within anchor caps at the extremities of a finger and thumb portions of a glove device as well as at various joint positions of the hand, to generate data identifying a flexion/extension and an abduction/adduction of the finger and thumb portions, the anchor caps further comprising at least one vibrating motor to relay the sensations of shape and structure of an object within the hand upon the alignment of the finger caps in the palm;
  b. transmitting via a plurality of tendon like cables the flexion/extension and the abduction/adduction data, to a plurality of measuring devices, housed within a housing structure;
  c. utilizing the data transmitted to measure the positional and the displacement data of the finger and thumb portion of the device;
  d. inputting the measured data into a processing device; and
  e. outputting by the processing device, an equal and opposite force via return force providers, wherein the equal and opposite force allows the flexion/extension and the abduction/adduction of the finger and thumb portions of the device.

* * * * *